(12) United States Patent
Zhang et al.

(10) Patent No.: US 10,903,972 B2
(45) Date of Patent: *Jan. 26, 2021

(54) METHODS AND SYSTEMS FOR NUMEROLOGY DETERMINATION OF WIRELESS COMMUNICATION SYSTEMS

(71) Applicant: Huawei Technologies Co., Ltd., Shenzhen (CN)

(72) Inventors: Liqing Zhang, Ottawa (CA); Hao Tang, Shanghai (CN); Xinxian Li, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,406

(22) Filed: Nov. 8, 2019

(65) Prior Publication Data
US 2020/0076564 A1 Mar. 5, 2020

Related U.S. Application Data

(63) Continuation of application No. 15/729,228, filed on Oct. 10, 2017, now Pat. No. 10,476,651.
(Continued)

(51) Int. Cl.
*H04L 5/00* (2006.01)
*H04W 72/04* (2009.01)
*H04L 27/26* (2006.01)

(52) U.S. Cl.
CPC .......... *H04L 5/0094* (2013.01); *H04L 5/0007* (2013.01); *H04L 5/0064* (2013.01);
(Continued)

(58) Field of Classification Search
CPC .. H04W 72/042; H04L 27/26; H04L 27/2602; H04L 5/0094; H04L 5/0007; H04L 5/0064; H04L 5/0091; H04L 5/0023
See application file for complete search history.

(56) References Cited

U.S. PATENT DOCUMENTS

2015/0282178 A1 10/2015 Kim et al.
2016/0020891 A1 1/2016 Jung et al.
(Continued)

FOREIGN PATENT DOCUMENTS

CN 104854801 A 8/2015
CN 106376050 A 2/2017
(Continued)

OTHER PUBLICATIONS

Nokia, et al., "Wider bandwidth operation for NR", 3GPP TSG-RAN-WG4 Meeting #82, R4-1700724, Feb. 13-17, 2017, 2 Pages, Athens, Greece.
(Continued)

*Primary Examiner* — Wayne H Cai
(74) *Attorney, Agent, or Firm* — Slater Matsil, LLP

(57) ABSTRACT

A method, system, and device to obtain a basic subcarrier spacing, or a channel bandwidth, or a maximum transmission bandwidth, or a usable subcarrier spacing set via a predefined mapping rule is provided. In an embodiment, a method in a network component to determine a system numerology includes determining, by the network component, one or more subcarrier spacing options from a candidate subcarrier spacing set that is associated with a carrier frequency band. The method also includes transmitting, by the network component, a signal indicating to one or more UEs one or more subcarrier spacing options from the candidate subcarrier spacing set.

32 Claims, 6 Drawing Sheets

405

| SCS (KHz): $SCS_i$ | 15 | 30 | 60 | 120 | 240 | 480 |
|---|---|---|---|---|---|---|
| NUMBER OF RBs: $N_i^*$ | $N_1$ | $N_2$ | $N_3$ | $N_4$ | $N_5$ | $N_6$ |
| A GUIDE BAND % | $g_1$ | $g_2$ | $g_3$ | $g_4$ | $g_5$ | $g_6$ |
| CHANNEL BANDWIDTH $i$ (MHz) FOR $SCS_i$ | $12 \cdot N_i \cdot SCS_i / (1-g_i/100)/1000$ ||||||
| $N_i \cdot 12 <$ MAXIMUM FFT SIZE ||||||||

Related U.S. Application Data

(60) Provisional application No. 62/467,937, filed on Mar. 7, 2017, provisional application No. 62/458,958, filed on Feb. 14, 2017.

(52) U.S. Cl.
CPC ............ *H04L 5/0091* (2013.01); *H04L 27/26* (2013.01); *H04L 27/2602* (2013.01); *H04W 72/042* (2013.01); *H04L 5/0023* (2013.01)

(56) References Cited

U.S. PATENT DOCUMENTS

| | | |
|---|---|---|
| 2016/0352551 A1 | 12/2016 | Zhang et al. |
| 2017/0111930 A1 | 4/2017 | Rajagopal et al. |
| 2018/0213511 A1 | 7/2018 | Takano |
| 2018/0235005 A1 | 8/2018 | Ansari et al. |
| 2018/0241495 A1 | 8/2018 | Xue et al. |
| 2018/0287846 A1 | 10/2018 | Kim et al. |
| 2019/0044676 A1* | 2/2019 | Li .......................... H04W 48/16 |
| 2019/0245730 A1* | 8/2019 | Yi ........................ H04L 27/2666 |
| 2020/0045658 A1* | 2/2020 | Nam ..................... H04L 5/0092 |

FOREIGN PATENT DOCUMENTS

| | | |
|---|---|---|
| CN | 107295542 A | 10/2017 |
| CN | 107889238 A | 4/2018 |
| CN | 108023695 A | 5/2018 |
| WO | 2016004634 A1 | 1/2016 |
| WO | 2016192644 A1 | 12/2016 |

OTHER PUBLICATIONS

Samsung, "Numerology for NR synchronization signal", 3GPP TSG RAN WG1 Meeting #87, R1-1612454, Nov. 14-18, 2016, 3 Pages, Reno, USA.

Samsung, "Bandwidth Operations", 3GPP TSG RAN WG1 Meeting #88, R1-1703009, Feb. 13-17, 2017, 10 Pages, Athens, Greece.

Mototola Mobility et al., "Numerology and structure for NR synchronization signal", 3GPP TSG RAN WG1 Meeting #88 R1-1703043, Feb. 13-17, 2017, 6 Pages, Athens, Greece.

\* cited by examiner

| CHANNEL BANDWIDTH $BW_{CHANNEL}$ [MHz] | 1.4 | 3 | 5 | 10 | 15 | 20 |
|---|---|---|---|---|---|---|
| TRANSMISSION BANDWIDTH CONFIGURATION $N_{RS}$ | 6 | 15 | 25 | 50 | 75 | 100 |

| SCS SET (kHz) | 15,30,60 | 30,60,120 | 60,120,240 | 240,480 |
|---|---|---|---|---|
| CHANNEL BW (MHz) | <=40 | 40~100 | 100~200 | 200~400 |

405

| SCS (KHz): $SCS_i$ | 15 | 30 | 60 | 120 | 240 | 480 |
|---|---|---|---|---|---|---|
| NUMBER OF RBs: $N_i^*$ | $N_1$ | $N_2$ | $N_3$ | $N_4$ | $N_5$ | $N_6$ |
| A GUIDE BAND % | $g_1$ | $g_2$ | $g_3$ | $g_4$ | $g_5$ | $g_6$ |
| CHANNEL BANDWIDTH $i$ (MHz) FOR $SCS_i$ | $12*N_i*SCS_i/(1-g_i/100)/1000$ ||||||
| $N_i * 12 <$ MAXIMUM FFT SIZE |||||||

| SCS SET (kHz) | 15,30,60 | 30,60,120 | 60,120,240 | 240,480 |
|---|---|---|---|---|
| BASIC SCS (kHz) | 30 | 60 | 120 | 240 |
| MAXIMUM CHANNEL BW (MHz) | 40 | 100 | 200 | 400 |

| SCS SET (kHz) | 15,30,60 | 30,60,120 | 60,120,240 | 240,480 |
|---|---|---|---|---|
| MAXIMUM CHANNEL BW (MHz) | 40 | 100 | 200 | 400 |
| MAXIMUM TRANSMISSION BW ($N_{RB}$) | 110 | 110 | 110 | 110 |

| SCS SET (kHz) | 15,30,60 | 30,60,120 | 60,120,240 | 240,480 |
|---|---|---|---|---|
| BASIC SCS (kHz) | 30 | 60 | 120 | 240 |
| MAXIMUM CHANNEL BW (MHz) | 40 | 100 | 200 | 400 |
| MAXIMUM TRANSMISSION BW ($N_{RB}$) | 110 | 110 | 110 | 110 |

| | SCS (kHz) | 15 | 30 | 60 | 120 | 240 | 480 | |
|---|---|---|---|---|---|---|---|---|
| FFT SIZE | 4096 | 40 | 80 | 160 | 320 | 640 | 1280 | CHANNEL BANDWIDTH (MHz) |
| | 2048 | 20 | 40 | 80 | 160 | 320 | 640 | |
| | 1024 | 10 | 20 | 40 | 80 | 160 | 320 | |
| | ⋮ | ⋮ | ⋮ | ⋮ | ⋮ | ⋮ | ⋮ | |

| SYSTEM CHANNEL BW (MHz) | 5 | 20 | 40 | 80 | 100 | 160 | 200 | 320 | 400 |
|---|---|---|---|---|---|---|---|---|---|
| SCS SET (kHz) | 15,30,60 | 15,30,60 | 15,30,60 | 30,60,120 | 60,120 | 60,120,240 | 120,240 | 240,480 | 240,480 |

| SYSTEM CHANNEL BW (MHz) | 40 | 80 | 160 | 320 |
|---|---|---|---|---|
| USABLE SCS SET (kHz) | 15,30,60 | 30,60,120 | 60,120,240 | 240,480 |
| USABLE SCS/FFT SIZES | 15/4096 30/2048 60/1024 | 30/4096 60/2048 120/1024 | 60/4096 120/2048 240/1024 | 240/2048 480/1024 |

| SCS (kHz) | 15 | | 30 | | 60 | | 120 | |
|---|---|---|---|---|---|---|---|---|
| MAXIMUM NUMBER OF SUBCARRIERS PER NR CARRIER | B/W (MHz) OPTION 1 | B/W (MHz) OPTION 2 | B/W (MHz) OPTION 1 | B/W (MHz) OPTION 2 | B/W (MHz) OPTION 1 | B/W (MHz) OPTION 2 | B/W (MHz) OPTION 1 | B/W (MHz) OPTION 2 |
| 3300 | 50 | 55 | 100 | 110 | 200 | 220 | 400 | - |
| 6600 | 100 | 110 | 200 | 220 | 400 | - | - | - |

FIG. 6D

METHODS AND SYSTEMS FOR NUMEROLOGY DETERMINATION OF WIRELESS COMMUNICATION SYSTEMS

This application is a continuation of U.S. patent application Ser. No. 15/729,228, filed on Oct. 10, 2017, entitled "Methods and Systems for Numerology Determination of Wireless Communication Systems," which claims priority to U.S. Provisional Application No. 62/467,937, filed on Mar. 7, 2017, entitled "Methods and Systems for Numerology Determination of Wireless Communication Systems," and U.S. Provisional Application No. 62/458,958, filed on Feb. 14, 2017, entitled "Methods and Systems for Numerology of Wireless Communication Systems," which applications are incorporated herein by reference.

TECHNICAL FIELD

The present disclosure relates to a numerology determination of a wireless communication system.

BACKGROUND

In conventional wireless networks, fixed numerologies have been employed to allow for an ease of design. The parameters of the numerology are typically set based on an understanding of the normal usage parameters of the network. In future networks, a more diverse set of needs should be served. Future networks may operate at a variety of different frequencies and serve a variety of different devices. Satisfying the diverse requirements for future wireless networks, such as fifth generation (5G) wireless networks, may be accomplished according to multiple approaches. In a first approach, which may be considered backward compatible with LTE, sampling frequencies and subcarrier frequencies are selected as integer multiples of the sampling frequencies and subcarrier frequencies already established for LTE. In a second approach, which may be considered to have so-called forward compatibility, the sampling frequencies and subcarrier frequencies are closely related to the sampling frequencies and subcarrier frequencies set for LTE, but are non-integer multiples. For the first approach, the backward compatible to LTE solution, there are two versions of the solutions based on the number of symbols and cyclic prefix (CP) lengths in a sub-frame or transmission time interval. First version solutions are strictly compatible with LTE and involve using seven symbols or "7(1,6)" symbols in a sub-frame. The notation 7(1,6) represents a scheme with a first CP length for one symbol among the seven symbols and a second CP length for the other six symbols. For strict compatibility with LTE, the two CP lengths and the CP overhead in the base subcarrier spacing of 15 kHz are arranged to be the same as the two CP lengths and the CP overhead of current LTE. The second version solutions may be seen as closely compatible to LTE in the sense that their CP overhead and seven symbols in a sub-frame are the same as the CP overhead and the number of symbols used for current LTE, however, the symbols with different CP lengths are distributed in a manner distinct from LTE, e.g., 7(3,4) and 7(2,5).

In LTE, the parameter transmission time interval (TTI) is used to refer to the transmission time for a defined set of OFDM symbols. In some examples, TTI can also be referred to as a "transmission time unit (TTU)" or "sub-frame duration", which indicates the physical (PHY) layer symbol and frame time structure. Similar to TTI, TTU and "sub-frame duration" are each equal to the sum of the useful symbol duration and any symbol overhead such as cyclic prefix CP time for all of the OFDM symbols include in a set. For the second approach, with so-called forward compatibility, a flexible number of symbol configurations may be considered per transmission time interval (TTI). For any base SS, any number of symbols per TTI can be configured. This may be referred to as a discretionary N (dN) solution, based on the diverse requirements of applications, such as latency, control/data, TDD/FDD configurations, and co-existence, etc. As will be addressed hereinafter, the term "co-existence" relates to two or more sub-bands in use for a given connection employing compatible numerologies.

In LTE, a channel bandwidth and a transmission bandwidth are defined, where the channel bandwidth is defined as the bandwidth of a carrier while the transmission bandwidth is defined as the number of available RB (Resource Block) in the carrier. In LTE, since RBs with different subcarrier spacing occupy same bandwidth, the transmission bandwidth can apply to all subcarrier spacing.

However, in New Radio (NR), 12, the number of subcarriers, is same for all RBs with different subcarrier spacing. Hence subcarrier spacing sets suitable for different channel bandwidth are different. Then it should be determined for the relationships among channel bandwidth, transmission bandwidth and subcarrier spacing.

In LTE, the channel bandwidth includes a useful transmission bandwidth and guide band, where the guide band is about 10% of the channel bandwidth for sub-6 GHz bands. In NR, the higher spectrum efficiency can be achieved, where that the guide band can be reduced significantly or even can be removed, for example, 1% of the channel bandwidth can be used for guide band.

To determine a channel bandwidth for a given subcarrier spacing, the number of the subcarriers used in the channel bandwidth should be constrained by the reasonable implementation costs, for example, FFT size or sampling rate. As a result, the maximum channel bandwidth for the given subcarrier spacing, and the available maximum channel bandwidths are different for different subcarrier spacing options.

SUMMARY

In an embodiment, a method in a network component to determine system numerology and channel bandwidth includes determining, by the network component, one or more subcarrier spacing options from a candidate subcarrier spacing set that is associated with a carrier frequency band. The method also includes transmitting, by the network component, a signal indicating to one or more UEs one or more subcarrier spacing options from the candidate subcarrier spacing set.

In an embodiment, a wireless device for determine system numerology and channel bandwidth includes a processor; and a computer readable storage medium storing programming for execution by the processor. The programming includes instructions for determining one or more subcarrier spacing options from a candidate subcarrier spacing set that is associated with a carrier frequency band. The programming also includes instructions for transmitting a signal indicating to one or more UEs one or more subcarrier spacing options from the candidate subcarrier spacing set.

In an embodiment, a non-transitory computer-readable medium storing computer instructions for instructing a wireless device to determine system numerology and channel bandwidth, that when executed by one or more processors, cause the one or more processors to perform determining one or more subcarrier spacing options from a candidate subcarrier spacing set that is associated with a carrier frequency band. The instructions, when executed by one or more processors, also cause the one or more processors to perform transmitting a signal indicating to one or more UEs one or more subcarrier spacing options from the candidate subcarrier spacing set.

In an embodiment, a method in a network component to determine system numerology and channel bandwidth includes determining, by the network component, one or more channel bandwidths selected from a set of channel bandwidths. The method also includes transmitting, by the network component, a signal indicating the one or more channel bandwidths.

In an embodiment, a method in a network component to determine system numerology and channel bandwidth includes acquiring, by the network component, a candidate subcarrier spacing set. The method also includes determining, by the network component, a maximum channel bandwidth or a maximum transmission bandwidth.

In an embodiment, a wireless device for encoding data with a polar code a processor and a computer readable storage medium storing programming for execution by the processor. The programming includes instructions for acquiring a candidate subcarrier spacing set. The programming also includes instructions for determining a maximum channel bandwidth or a maximum transmission bandwidth.

In an embodiment, a non-transitory computer-readable medium storing computer instructions for instructing a wireless device to encode data with a polar code is provided. When executed by one or more processors, programming cause the one or more processors to perform acquiring a candidate subcarrier spacing set. When executed by one or more processors, the programming also cause the one or more processors to perform determining a maximum channel bandwidth or a maximum transmission bandwidth.

In one or more aspects, the method also includes determining, by the network component, one or more channel bandwidths selected from a set of channel bandwidths. The method also includes transmitting, by the network component, a signal indicating the one or more channel bandwidths In one or more aspects, the channel bandwidth is one of a sub 6 GHz band or an above 6 GHz band.

In one or more aspects, a candidate subcarrier spacing set associated with a carrier frequency band is pre-defined and preconfigured by the network.

In one or more aspects, transmitting the signal comprises one of semi-static signaling and dynamic signaling.

In one or more aspects, the transmitting the signal comprises one of an transmitting a radio resource control (RRC) signal and transmitting a layer 1 (L1) signal.

In one or more aspects, the transmitting the signal comprises one of transmitting a broadcast message, a multi-cast message, and a uni-cast message.

In one or more aspects, the method includes determining a maximum channel bandwidth or a maximum transmission bandwidth according to the carrier frequency band.

In one or more aspects, the method also includes, before the determining the maximum channel bandwidth or the maximum transmission bandwidth, determining, by the network component, a basic subcarrier spacing in the candidate subcarrier spacing set.

In one or more aspects, the maximum transmission bandwidth is determined, by the network component, in accordance with the maximum channel bandwidth.

In one or more aspects, the maximum channel bandwidth is determined, by the network component, in accordance with a maximum fast Fourier transform (FFT) size for a given subcarrier spacing.

In one or more aspects, the method also includes acquiring, by the network component, a usable subcarrier spacing set from the subcarrier spacing set in accordance with a carrier frequency band In one or more aspects, the transmission bandwidth location is determined according to a number of resource blocks (RBs) in the carrier frequency band and a reference point.

In one or more aspects, each usable subcarrier spacing set is associated with FFT sizes such that a same sampling rate is maintained over different usable scalable subcarrier spacing (SCS) options applicable to a given channel bandwidth.

In some embodiments, the disclosed systems and methods have a number of advantages. For example, the disclosed methods may provide one way of determining the subcarrier spacing options that are associated with the channel or transmissions bandwidths in a frequency band, and determining the relationship of sampling rate/maximum FFT size associated with a number of used subcarriers in a frequency bandwidth, such that the system can have efficient operations and super performance with reasonable implementation complexity.

Other aspects and features of embodiments of the present disclosure will become apparent to those ordinarily skilled in the art upon review of the following description.

BRIEF DESCRIPTION OF THE DRAWINGS

For a more complete understanding of the present invention, and the advantages thereof, reference is now made to the following descriptions taken in conjunction with the accompanying drawings, in which:

FIG. 4B shows an example tabulated scheme to determine a channel bandwidth based on a subcarrier spacing and the number of subcarriers (or RBs).

FIG. 4C shows an example of the maximum channel bandwidth depending on basic SCS.

FIG. 5A shows an example of the transmission bandwidth depending on SCS sets.

FIG. 5B shows an example of the transmission bandwidth depending on basic SCS.

FIG. 6A shows an example of SCS associated with channel bandwidth based on maximum FFT size.

FIG. 6B shows an example of system channel bandwidth associated with usable SCS.

FIG. 6C shows an example of system channel bandwidth associated with usable SCS and FFT size.

FIG. 6D shows an example of the carrier bandwidths (b/ws) for given SCS options to support the maximum number of subcarriers per NR carrier is 3300 or 6600.

DETAILED DESCRIPTION OF ILLUSTRATIVE EMBODIMENTS

Figure 1:
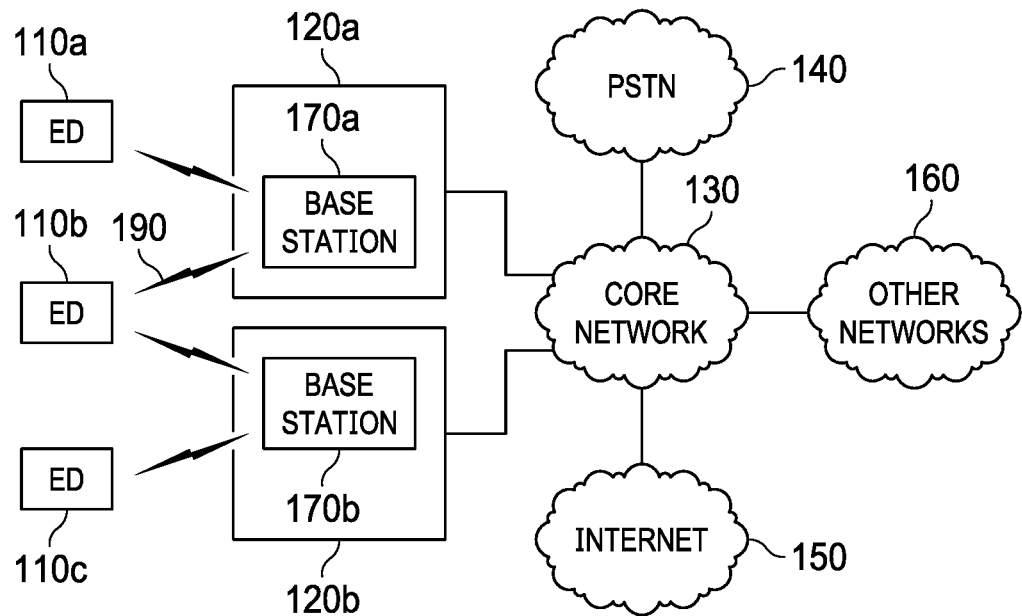
FIG. 1 shows a communication system.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods and devices to obtain a basic subcarrier spacing, or a channel bandwidth, or a maximum transmission bandwidth, or a usable subcarrier spacing set via predefined mapping rule.

Also disclosed herein are methods and systems for providing an OFDM numerology scheme in a communications system permitting one or more of multiple subcarrier spacing options, multiple transmission TTI options, multiple CP options, multiple carrier bandwidth options, or multiple FFT sizes.

In accordance with an embodiment of the disclosure, a method to obtain the maximum channel bandwidth and/or maximum transmission bandwidth from subcarrier spacing set is provided via a mapping rule.

In accordance with an aspect of the disclosure, a method to obtain the maximum channel bandwidth and/or maximum transmission bandwidth from a basic subcarrier spacing is provided via a mapping rule.

In accordance with an aspect of the disclosure, a method to obtain the maximum transmission bandwidth from the maximum channel bandwidth is provided via a mapping rule.

In accordance with an aspect of the disclosure, a method to obtain the channel bandwidth from subcarrier spacing set and maximum FFT size is provided via a mapping rule.

In accordance with an aspect of the disclosure, a method to obtain the usable subcarrier spacing set from a system channel bandwidth is provided via a mapping rule.

In accordance with an aspect of the disclosure, a wireless device is provided to implement all embodiments for the methods to obtain at least one of the following parameters: basic subcarrier spacing, channel bandwidth, maximum transmission bandwidth, or usable subcarrier spacing set.

In an embodiment, a method in a network component to determine system numerology and channel bandwidth includes determining, by the network component, one or more subcarrier spacing options from a candidate subcarrier spacing set that is associated with a carrier frequency band. The method also includes transmitting, by the network component, a signal indicating to one or more UEs one or more subcarrier spacing options from the candidate subcarrier spacing set.

In an embodiment, a wireless device for determining system numerology and channel bandwidth includes a processor; and a computer readable storage medium storing programming for execution by the processor. The programming includes instructions for determining one or more subcarrier spacing options from a candidate subcarrier spacing set that is associated with a carrier frequency band. The programming also includes instructions for transmitting a signal indicating to one or more UEs one or more subcarrier spacing options from the candidate subcarrier spacing set.

In an embodiment, a non-transitory computer-readable medium storing computer instructions for instructing a wireless device to determine system numerology and channel bandwidth, that when executed by one or more processors, cause the one or more processors to perform determining one or more subcarrier spacing options from a candidate subcarrier spacing set that is associated with a carrier frequency band. The instructions, when executed by one or more processors, also cause the one or more processors to perform transmitting a signal indicating to one or more UEs one or more subcarrier spacing options from the candidate subcarrier spacing set.

In an embodiment, a method in a network component to determine system numerology and channel bandwidth includes determining, by the network component, one or more channel bandwidths selected from a set of channel bandwidths. The method also includes transmitting, by the network component, a signal indicating the one or more channel bandwidths.

In one or more aspects, the method also includes determining, by the network component, one or more channel bandwidths selected from a set of channel bandwidths. The method also includes transmitting, by the network component, a signal indicating the one or more channel bandwidths In one or more aspects, the channel bandwidth is one of a sub 6 GHz band or an above 6 GHz band.

In one or more aspects, a candidate subcarrier spacing set associated with a carrier frequency band is pre-defined and preconfigured by the network.

In one or more aspects, transmitting the signal comprises one of semi-static signaling and dynamic signaling.

In one or more aspects, the transmitting the signal comprises one of an transmitting a radio resource control (RRC) signal and transmitting a layer 1 (L1) signal.

In one or more aspects, the transmitting the signal comprises one of transmitting a broadcast message, a multi-cast message, and a uni-cast message.

In one or more aspects, the method includes determining a maximum channel bandwidth or a maximum transmission bandwidth according to the carrier frequency band.

In one or more aspects, the method also includes, before the determining the maximum channel bandwidth or the maximum transmission bandwidth, determining, by the network component, a basic subcarrier spacing in the candidate subcarrier spacing set.

In one or more aspects, the maximum transmission bandwidth is determined, by the network component, in accordance with the maximum channel bandwidth.

In one or more aspects, the maximum channel bandwidth is determined, by the network component, in accordance with a maximum fast Fourier transform (FFT) size for a given subcarrier spacing.

In one or more aspects, the method also includes acquiring, by the network component, a usable subcarrier spacing set from the subcarrier spacing set in accordance with a carrier frequency band In one or more aspects, the transmission bandwidth location is determined according to a number of resource blocks (RBs) in the carrier frequency band and a reference point.

In one or more aspects, each usable subcarrier spacing set is associated with FFT sizes such that a same sampling rate is maintained over different usable scalable subcarrier spacing (SCS) options applicable to a given channel bandwidth.

Frame structures have been proposed that are flexible in terms of the use of differing numerologies. A numerology is defined as the set of physical layer parameters of the air interface that are used to communicate a particular signal. A numerology is described in terms of at least subcarrier spacing and OFDM symbol duration, and may also be defined by other parameters such as fast Fourier transform (FFT)/inverse FFT (IFFT) length, transmission time slot length, and cyclic prefix (CP) length or duration. In some implementations, the definition of the numerology may also include which one of several candidate waveforms is used to communicate the signal. Possible waveform candidates may include, but are not limited to, one or more orthogonal or non-orthogonal waveforms selected from the following: Orthogonal Frequency Division Multiplexing (OFDM), Filtered OFDM (f-OFDM), Filter Bank Multicarrier (FBMC), Universal Filtered Multicarrier (UFMC), Generalized Frequency Division Multiplexing (GFDM), Single Carrier Frequency Division Multiple Access (SC-FDMA), Low Density Signature Multicarrier Code Division Multiple Access (LDS-MC-CDMA), Wavelet Packet Modulation (WPM), Faster Than Nyquist (FTN) Waveform, low Peak to Average Power Ratio Waveform (low PAPR WF), Pattern Division Multiple Access (PDMA), Lattice Partition Multiple Access (LPMA), Resource Spread Multiple Access (RSMA), and Sparse Code Multiple Access (SCMA).

These numerologies may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Table 1 below shows the parameters associated with some example numerologies, in the four columns under "Frame structure". Frames can be configured using one or a combination of the four scalable numerologies. For comparison purposes, in the right hand column of the table, the conventional fixed LTE numerology is shown. The first column is for a numerology with 60 kHz subcarrier spacing, which also has the shortest OFDM symbol duration because OFDM symbol duration varies inversely with subcarrier spacing. This may be suitable for ultra-low latency communications, such as Vehicle-to-Any (V2X) communications. The second column is for a numerology with 30 kHz subcarrier spacing. The third column is for a numerology with 15 kHz subcarrier spacing. This numerology has the same configuration as in LTE, except there are only 7 symbols in a time slot. This may be suitable for broadband services. The fourth column is for a numerology with 7.5 kHz spacing, which also has the longest OFDM symbol duration among the four numerologies. This may be useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. As illustrated in the example above, the subcarrier spacing of each numerology (7.5 kHz, 15 kHz, 30 kHz, 60 kHz) can be a factor of $2^n$ times the smallest subcarrier spacing, where n is an integer. Larger subcarrier spacings that are also related by a factor of $2^n$, such as 120 kHz, may also or alternatively be used. Smaller subcarrier spacings that are also related by a factor of $2^n$, such as 3.75 kHz, may also or alternatively be used. The symbol durations of the numerologies may also be related by a factor of $2^n$. Two or more numerologies that are related in this way are sometimes referred to as scalable numerologies.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz, 120 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

In Table 1, each numerology uses a first cyclic prefix length for a first number of OFDM symbols, and a second cyclic prefix length for a second number of OFDM symbols. For example, in the first column under "Frame structure", the time slot includes 3 symbols with a cyclic prefix length of 1.04 μs followed by 4 symbols with a cyclic prefix length of 1.3 μs.

TABLE 1

Example set of Numerologies

| Parameters | Frame structure | | | | Baseline (LTE) |
| --- | --- | --- | --- | --- | --- |
| time slot Length | 0.125 ms | 0.25 ms | 0.5 ms | 1 ms | TTI = 1 ms |
| Subcarrier spacing | 60 kHz | 30 kHz | 15 kHz | 7.5 kHz | 15 kHz |
| FFT size | 512 | 1024 | 2048 | 4096 | 2048 |
| Symbol duration | 16.67 μs | 33.33 μs | 66.67 μs | 133.33 μs | 66.67 μs |
| #symbols in each time slot | 7 (3, 4) | 7 (3, 4) | 7 (3, 4) | 7 (3, 4) | 14 (2, 12) |
| CP length | 1.04 μs, 1.30 μs (32,40 point) | 2.08 μs, 2.60 μs (64,80 point) | 4.17 μs, 5.21 μs (128,160 point) | 8.33 μs, 10.42 μs (256,320 point) | 5.2 μs, 4.7 μs (160,144 point) |
| CP overhead | 6.67% | 6.67% | 6.67% | 6.67% | 6.67% |
| BW (MHz) | 20 | 20 | 20 | 20 | 20 |

In Table 2, an example set of numerologies is shown, in which different cyclic prefix lengths can be used in different numerologies having the same subcarrier spacing.

TABLE 2

Example numerology with different CP lengths

| | | | | | | |
|---|---|---|---|---|---|---|
| Subcarrier spacing (kHz) | 15 | 30 | 30 | 60 | 60 | 60 |
| Useful duration $T_u$ (μs) | 66.67 | 33.33 | 33.33 | 16.67 | 16.67 | 16.67 |
| CP length (μs) (1) | 5.2 | 5.73 | 2.6 | 2.86 | 1.3 | 3.65 |
| CP length (μs) (6 or 12) | 4.7 | 5.08 | 2.34 | 2.54 | 1.17 | 3.13 |
| # of symbols per TTI | 7(1, 6) | 13(1, 12) | 7(1, 6) | 13(1, 12) | 7(1, 6) | 25(10, 15) |
| TTI (ms) | 0.5 | 0.5 | 0.25 | 0.25 | 0.125 | 0.5 |
| CP overhead | 6.70% | 13.30% | 6.70% | 13.30% | 6.70% | 16.67% |

It should be understood that the specific numerologies of the examples of Tables 1 and 2 are for illustration purposes, and that a flexible frame structure combining other numerologies can alternatively be employed.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipment (UEs). In a specific example, filtered OFDM (f-OFDM) can be employed by using filtering to shape the frequency spectrum of each sub-band OFDM signal, thereby producing a frequency localized waveform, and then combining the sub-band OFDM signals for transmission. f-OFDM lowers out-of-band emission and improves transmission, and addresses the non-orthogonality introduced as a result of the use of different subcarrier spacings. Alternatively, a different approach can be used to achieve a frequency localized waveform, such as windowed OFDM (W-OFDM).

The use of different numerologies can allow the coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. The signaling can be done in a dynamic or a semi-static manner, for example in a control channel such as the physical downlink control channel (PDCCH), or group common PDCCH, or in downlink control information (DCI). Other signaling options include a media access control (MAC) control element (CE) message, RRC message, broadcast or multi-cast signal. Based on this signaling, the ED may determine the parameters of the selected numerology from other information, such as a look-up table of candidate numerologies stored in memory.

FIG. 1 illustrates an example communication system 100. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The EDs 110a-110c are configured to operate and/or communicate in the system 100. For example, the EDs 110a-110c are configured to transmit and/or receive via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 110a-110c are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
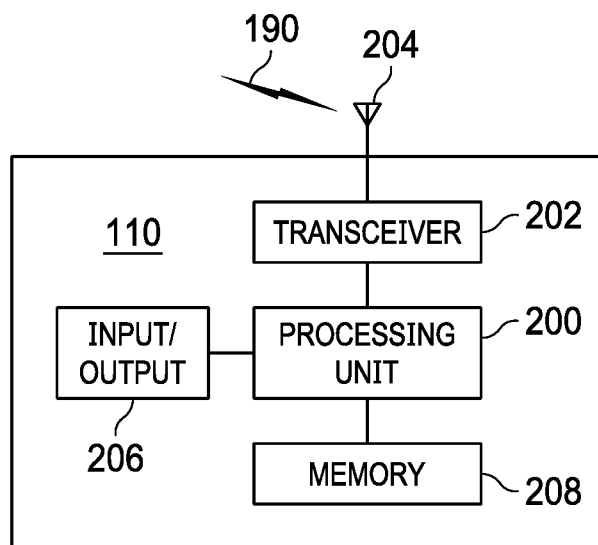
FIG. 2A shows an exemplary wireless communication device.
Figures 2B, 3, 4A:
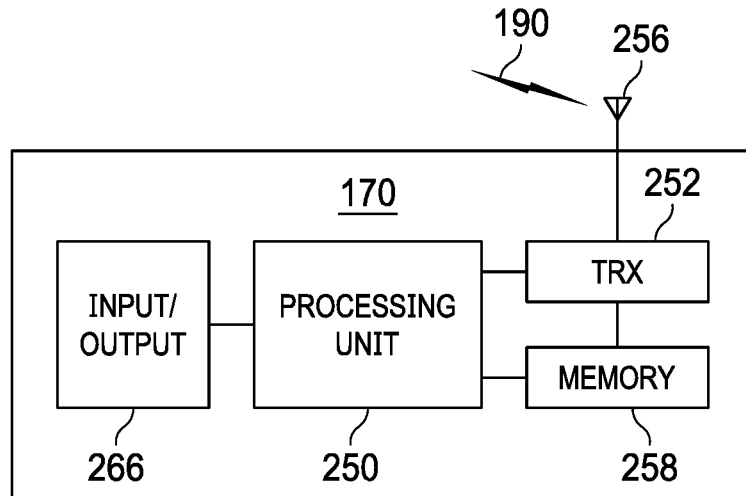
FIG. 2B shows an exemplary base station.
FIG. 3 shows an example of present transmission bandwidth configuration.
FIG. 4A shows an example of the maximum channel bandwidth depending on SCS sets.

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transceiver 252, which includes functionality for a transmitter and a receiver, one or more antennas 256, at least one memory 258, and one or more input/output devices or interfaces 266. A scheduler 253, which would be understood by one skilled in the art, is coupled to the processing unit 250. The scheduler 253 could be included within or operated separately from the base station 170. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transceiver 252 includes any suitable structure for generating signals for wireless or wired transmission to one or more EDs or other devices. Each transceiver 252 further includes any suitable structure for processing signals received wirelessly or by wire from one or more EDs or other devices. Although shown combined as a transceiver 252, a transmitter and a receiver could be separate components. Each antenna 256 includes any suitable structure for transmitting and/or receiving wireless or wired signals. While a common antenna 256 is shown here as being coupled to the transceiver 252, one or more antennas 256 could be coupled to the transceiver(s) 252, allowing separate antennas 256 to be coupled to the transmitter and the receiver if equipped as separate components. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

FIG. 3 is a table 300 that illustrates an example of present transmission bandwidth (BW) configuration NRB (number of RB) in E-UTRA channel bandwidths.

In example aspects, for backward and forward compatibility solutions, the design methodology and criteria are as follows: for any base subcarrier spacing (15 kHz, 16.875 kHz, 17.5 kHz, 22.5 kHz, 16.5 kHz, etc.), the integer scalable subcarrier spacing (SCS) values have an inversely scalable relationship over the CPs for a given CP overhead. Moreover, the integer scalable SCS values have an inversely scalable relationship over both CPs and TTIs for a given number of symbols and given CP overhead. Larger IIIs can be concatenated by smaller TTIs, where a minimum TTI (or basic TTI unit) consists of the minimum number of symbols that is valid for implementation configurable in the TTI in such base subcarrier spacing. For one example, a scheme using 15 kHz subcarrier spacing is valid with seven symbols per TTI to make the scheme backward compatible to LTE. For another example, a scheme using 16.875 kHz subcarrier spacing is valid with one symbol per TTI for the implementation. The parameter (e.g., SS, TTI, CP) configurations are based on the diverse requirements of applications, such as latency, control/data, TDD/FDD configurations, and co-existence, etc.

In example aspects, a communications network is provided that employs an OFDM transmission system in which the OFDM transmission parameters, such as subcarrier spacing parameter, can be configured to accommodate for different requests that may be placed on the network. Such requests may be related to factors such as speed of user equipment (UE), use of high frequency bands, or use of low cost, narrowly spaced frequency bandwidth communications devices. In this regard, OFDM numerology schemes are described herein that can be applied to radio frame structures for both FDD and TDD modes in a wireless network. Conveniently, the OFDM numerology schemes permit one or more of: multiple subcarrier spacing options; multiple transmission time interval (TTI) options; multiple cyclic prefix (CP) options; multiple carrier bandwidth options; and multiple fast Fourier Transform (FFT) sizes. Accordingly, the OFDM numerology schemes may be flexible enough to satisfy different requirements that may arise in the wireless network.

Example aspects are described herein in which the parameters of a Filtered OFDM (F-OFDM) system may, in at least some applications, be configurable to support multiple waveforms, multiple access schemes and multiple frame structures, thereby accommodating a range of application scenarios and service requirements. By way of example, FIG. 3 illustrates an F-OFDM time-frequency signal plot illustrating the application of three sub-band filters to create OFDM subcarrier groupings with three different inter-subcarrier spacings, OFDM symbol durations and guard periods. By enabling multiple parameter configurations, F-OFDM can, in at least some applications, allow for the optimal selection of parameters for each service group and, thus, may facilitate overall system efficiency.

In example aspects, the OFDM numerology with scalable features are designed with TTIs that are linearly and inversely scaled with subcarrier spacing options to maintain a limited set of sampling frequencies for different FFT sizes. In some applications, such a configuration may reduce the complexity of the network interface used in communications equipment—for example, chipset implementation complexity in receiving devices may be reduced. In some example aspects, optimized CP and TTI schemes are provided to achieve one-for-all applications for each subcarrier spacing option.

FIGS. 4A, 4B, and 4C show tables 400, 405, 410 that illustrate SCS set for channel bandwidth, a channel bandwidth determination, and basic SCS and maximum channel BW, respectively. The available maximum channel bandwidth in different bands are different, e.g., 100 MHz for sub 6 GHz and 400 MHz for above 6 GHz. Candidate SCS (SubCarrier Spacing) set is different for different bands, e.g., {15, 30, 60} kHz for 3.5 GHz, {30, 60, 120} kHz for 6 GHz, {60, 120, 240} kHz for 28 GHz, and {240, 480} kHz for 70 GHz. As a result, the selection of subcarrier spacing options depends on what frequency band (e.g., sub 6 GHz or above 6 GHz), and the maximum bandwidths in different bands are different (e.g., 100 MHz for sub 6 GHz and 400 MHz for higher frequency band). One example aspect is shown in FIG. 4A, where the maximum channel bandwidth is defined based on different SCS sets. As a result, the channel bandwidth or transmission bandwidth (in which the guide bands are excluded from the channel bandwidth, if any) is associated with a carrier band (e.g., 6 GHz), numerology (including subcarrier spacing and CP) and the number of subcarriers, where the maximum number of subcarriers per channel bandwidth will be constrained by maximum FFT size (e.g., 4096), and a subcarrier spacing option or a subcarrier spacing set will be based on a carrier frequency band. In some embodiment, a subcarrier spacing (SCS) option can be chosen from a subcarrier spacing option set that is associated with and pre-defined for a carrier frequency band, where the SCS selection may be based on certain considerations such as application requirements, mobility, timing synchronization, and/or propagation environment, etc. In a network, one or more carrier frequency bands can be included, so the associated numerology/subcarrier spacing sets can be determined accordingly; the network will configure one or more subcarrier spacing options for each carrier frequency band.

The subcarrier spacing option set associated with a carrier frequency band can be defined in a form of table where each SCS can use an index to be indicated in the signaling messages from the base station; or the base station can send the configuration and pre-configuration signaling describing the table. The configuration of a subcarrier spacing, a channel bandwidth and/or the association table can be performed by different schemes, for example, broadcast, multicast, and/or uni-cast channel; or semi-static (radio resource control (RRC) signaling or with a MAC CE), dynamic signaling (e.g., layer 1 (L1) or downlink control information (DCI) signaling) and/or a downlink (DL) control channel such as group common PDCCH.

The network configures one or more subcarrier spacing options based on or associated with a carrier frequency band, where the carrier frequency band can be, e.g., 1.8 GHz, 2.4 GHz, or 35 GHz, or 75 GHz band. A sub 6 GHz band is used to describe one if the carrier frequency band is below 6 GHz, while the above 6 GHz band is used to describe one if the carrier frequency band is above 6 GHz. Within each carrier frequency band, a channel bandwidth consists of a transmission bandwidth and a guide band (if any, for example 10% of the channel bandwidth can be a guide band in LTE). A channel bandwidth is based on a subcarrier spacing and the number of subcarriers or RBs used, where the maximum of channel bandwidth is depending on the maximum number of subcarriers used (e.g., <maximum FFT size). Due to the fact that there are numerical channel bandwidths possible, depending on number of subcarriers/RBs for any given numerology, usually only a few channel bandwidth options can be defined, such as 5 MHz, 10 MHz, 20 MHz, 50 MHz, 100 MHz for sub 6 GHz band. One numerology will include parameters of at least subcarrier spacing and CP overhead.

Thus, for a given numerology, a channel bandwidth may be determined by the number of subcarriers or the number resource blocks (RBs) used and (optionally) guide band in the channel bandwidth; for example, with a 10% guide band, 5 MHz channel bandwidth can be constructed by 15 KHz subcarriers with 25 RBs; and the transmission bandwidth can be determined once the (optional) guide band location is determined/configured in the channel bandwidth. The guide band configuration (if any) can be included in the signaling described in the above paragraph. It is noted that a channel bandwidth is usually smaller than the maximum channel bandwidth in a given carrier frequency band, and this is considered based on a few factors, for example, to support co-existence with LTE and UE maximum bandwidth processing capability, and to consider the actual bandwidth requirements in an application or service, etc. A tabulated scheme to determine a channel bandwidth based on a subcarrier spacing and the number of subcarriers (or RBs) is given in FIG. 4B.

FIG. 4C provides an example aspect where a basic SCS is defined for each SCS set and the maximum channel bandwidth is mapped from the basic SCS. The basic SCS applies for most of scenarios and services. For example, in an SCS set {15, 30, 60} kHz, SCS of 30 kHz in 3.5 GHz applies to most of eMBB users, SCS of 15 kHz applies to low speed and large delay spread scenarios, and SCS of 60 kHz applies to high Doppler and URLLC scenarios. Hence the 30 kHz can be the basic SCS for the SCS set {15, 30, 60} kHz. The maximum channel bandwidth can be defined based on the basic SCS and maximum FFT size. In FIG. 4C, the maximum FFT size is 2048 as an example.

When maximum channel bandwidth is determined, e.g. from the examples of FIG. 4A, FIG. 4B, FIG. 4C, the maximum transmission bandwidth can be determined accordingly. With predefined rule, the maximum channel bandwidth and maximum transmission bandwidth can also be obtained simultaneously. An exemplary aspect is shown in in table 500 in FIG. 5A, where the maximum transmission bandwidth can be obtained or mapped from the maximum channel bandwidth or directly mapped from the candidate SCS set. For one SCS, if the number of RB corresponding to the maximum channel bandwidth of this carrier is larger than the maximum transmission bandwidth, the location of RB can be configurable, where the transmission bandwidth and its location can be configured in terms of number of RBs and a reference point, e.g., a center frequency of a carrier frequency band.

FIG. 5B is a table 510 that shows an example aspect of mapping maximum channel bandwidth and maximum transmission bandwidth from basic SCS.

FIG. 6A gives an exemplary table 600 for SCS and associated relationship with channel bandwidth based on maximum FFT size, where the maximum FFT size is 4096 but same rule applies also to high FFT size. With the table in FIG. 6A, given SCS and maximum FFT size, one transceiver can directly obtain the channel bandwidth. One benefit with such mapping is the capability of keeping sampling rate scalable with SCSs for different channel bandwidth for a given maximum FFT size.

Accordingly, it is feasible that the channel bandwidth (or range) is mapped from SCS set based on either sampling rate or maximum FFT size.

Alternatively, in other aspects, it is also feasible to choose one channel bandwidth for each SCS set, where the same sampling rate can be maintained over different SCS options in each SCS set.

FIG. 6B gives an exemplary table 610 for system channel bandwidth (i.e., sub-bands from a maximum channel bandwidth such as 400 MHz), the usable channel bandwidth in a practical system, and associated relationship with usable SCS set, which may be a subset of the SCS set for obtaining the maximum channel bandwidth and maximum transmission bandwidth (i.e., in which the guide bands are excluded from the maximum channel bandwidth, if any). Data or control signaling can be transmitted with the usable SCS set in a practical system. With an available system channel bandwidth, it is possible to obtain candidate usable SCS set directly from the table given in FIG. 6B. In present system with multiple usable SCS, up to 8 SCS types can be supported. Hence 3 bits are needed for each usable SCS, that requires three bits to indicate any of the SCS types. To reduce indication overhead, the association of a subset of SCSs with one system channel bandwidth makes it possible to save the signaling overhead for indicating a usable SCS associated with one system bandwidth; for example, two types of SCSs (60 KHz and 120 KHz) are associated with 100 MHz system bandwidth, where one bit can be used to indicate a specific SCS in the parameter configuration.

The configuration of one or more channel bandwidths and/or subcarrier spacing options to one or more UEs can be performed by different schemes, for example, broadcast, multicast, and/or unicast channel; or semi-static (RRC signaling or with a MAC CE), dynamic signaling (e.g., L1 or DCI signaling) and/or a DL control channel such as group common PDCCH.

One aspect is that the system bandwidths employed in a network can have a characteristics of scalability among a set of system bandwidths used in the network, where the scalability factor can be a positive integer. For example, the scalability factor can be $2^n$ with n being an integer; a set of system bandwidths can consist of 20 MHz, 40 MHz, 80 MHz, 160 MHz and 320 MHz, with a scalability factor of 2 from 20 MHz, which is shown in FIG. 6C. While the system channel bandwidths are integer multiple related, for each system channel bandwidth, each usable subcarrier spacing set is configured to be associated with FFT sizes in a way such that the same sampling rate can be maintained over different usable SCS options; for example, for the system bandwidth of 80 MHz, its associated SCS set is configured as 30 KHz, 60 KHz and 120 KHz, with FFT sizes of 4096, 2048, and 1024, respectively, which corresponds to a same sampling rate of 122.88 MHz. These characteristics are shown in table 620 in FIG. 6C.

The configuration of the system bandwidth(s), SCS(s) and the FFT size(s) to one or more UEs can be performed by different schemes, for example, broadcast, multicast, and/or uni-cast channel; or semi-static (RRC signaling or with a MAC CE) and/or dynamic signaling (e.g., L1 or DCI signaling).

In other aspects, at least for single numerology case, candidates of the maximum number of subcarriers per NR carrier is 3300 or 6600. For a given carrier bandwidth B and with one single numerology to be used, its SCS fm, chosen from a set of SCSs (e.g. 15, 30, 60, 120 kHz, etc.) scalable with LTE 15 kHz, requires to satisfy the conditions: fm*3300 (or fm*6600)<B. On the other hand, for a given subcarrier spacing fn, the supported carrier bandwidth, Bn, for a NR carrier can be determined by the relationship: Bn=fn*(3300+a set of guard subcarriers); or Bn=fn* (6600+a set of guard subcarriers), where the set of guard subcarriers are determined by factors such as the filtering waveform characteristics and DC subcarrier component, etc.; for example the set size can be 10% of Bn. Some aspect examples are given in table 630 in FIG. 6D. Note for the figure: 1) Option 1 and Option2 are based on different guard band factors, e.g., Option 2 assumes 10% guard band like LTE; other options with different guard bands (including zero guard band) are also possible. 2) the bandwidth beyond 400 MHz is not listed, as by standards, the maximum channel bandwidth supported per NR carrier is 400 MHz. In FIG. 6D, the '-' indicates this combination is not supported.

In another aspect, for mixed numerology cases, if the maximum number of subcarriers per NR carrier is 3300, and the multiplication of the subcarrier spacing fo and 3300 is not larger than the scalable carrier bandwidth, then fo and fo*2^N (N>0) could be used as the SCS for the scalable carrier band. This can be interpreted as the following: for a given carrier bandwidth, B1, and a set of SCSs associated with the carrier frequency band(s), the lowest SCS, fo, in the SCS set will satisfy the condition: fo*3300<B1, then the associated SCSs can be scalable up with fo, i.e., fo*2^N (N>0). For example, if a carrier bandwidth is 50 MHz, the fo can be 15 kHz, and other SCSs applicable to the associated frequency carrier band(s) can be scalable up with 15 kHz. If the maximum number of subcarriers per NR carrier is 6600, the above statement is also true, but should be associated with fo*6600<B2, where B2 is a given carrier bandwidth.

Figure 7:
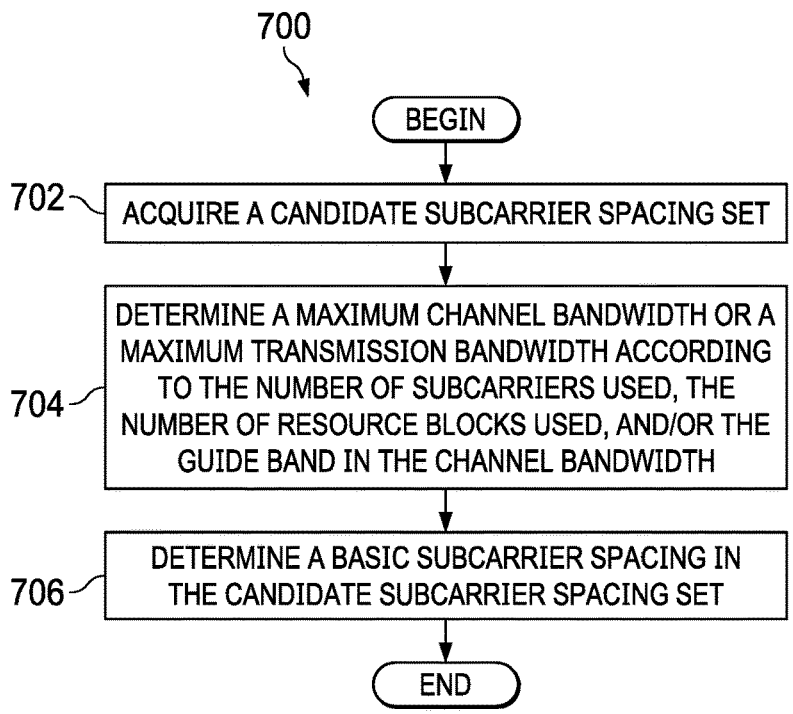
FIG. 7 is a flowchart illustrating an embodiment of a method 700 for numerology determination for wireless communication systems

FIG. 7 is a flowchart illustrating an embodiment of a method 700 for numerology determination for wireless communication systems. The method 700 begins at block 702 where the network component acquires a candidate subcarrier spacing set. The subcarrier spacing set may be acquired as described above with reference to FIGS. 4A-4C. At block 704, the network component determines a maximum channel bandwidth or maximum transmission bandwidth according to the number of subcarriers used, the number of resource blocks used, and/or the guide band in the channel bandwidth. At block 706, the network component determines a basic subcarrier spacing in the candidate subcarrier spacing set. The basic subcarrier spacing may be determined as described above with reference to FIGS. 4A-4C.

Figure 8:
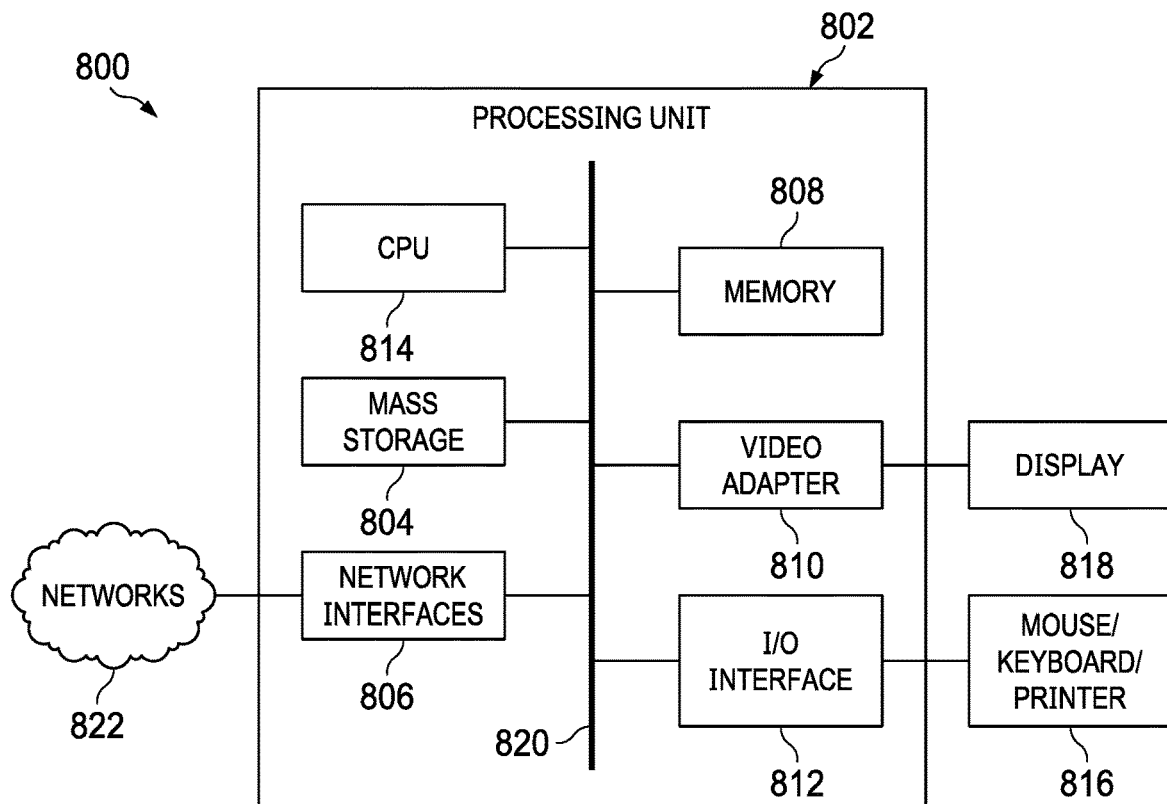
FIG. 8 shows an example of a computing system.

FIG. 8 is a block diagram of a computing system 800 that may be used for implementing the devices and methods disclosed herein. For example, the computing system can be any entity of UE, AN, MM, SM, UPGW, AS, BS, eNodeB, transmit-receive point (TRP), etc. Specific devices may utilize all of the components shown or only a subset of the components, and levels of integration may vary from device to device. Furthermore, a device may contain multiple instances of a component, such as multiple processing units, processors, memories, transmitters, receivers, etc. Such device can be can be any entity of UE, AN, MM, SM, UPGW, AS, BS, eNodeB, TRP (transmit-receive point), etc. The computing system 800 includes a processing unit 802. The processing unit includes a central processing unit (CPU) 814, memory 808, and may further include a mass storage device 804, a video adapter 810, and an I/O interface 812 connected to a bus 820.

The bus 820 may be one or more of any type of several bus architectures including a memory bus or memory controller, a peripheral bus, or a video bus. The CPU 814 may comprise any type of electronic data processor. The memory 808 may comprise any type of non-transitory system memory such as static random access memory (SRAM), dynamic random access memory (DRAM), synchronous DRAM (SDRAM), read-only memory (ROM), or a combination thereof. In an aspect, the memory 808 may include ROM for use at boot-up, and DRAM for program and data storage for use while executing programs.

The mass storage 804 may comprise any type of non-transitory storage device configured to store data, programs, and other information and to make the data, programs, and other information accessible via the bus 820. The mass storage 804 may comprise, for example, one or more of a solid state drive, hard disk drive, a magnetic disk drive, or an optical disk drive.

The video adapter 810 and the I/O interface 812 provide interfaces to couple external input and output devices to the processing unit 802. As illustrated, examples of input and output devices include a display 818 coupled to the video adapter 810 and a mouse/keyboard/printer 816 coupled to the I/O interface 812. Other devices may be coupled to the processing unit 802, and additional or fewer interface cards may be utilized. For example, a serial interface such as Universal Serial Bus (USB) (not shown) may be used to provide an interface for an external device.

The processing unit 802 also includes one or more network interfaces 806, which may comprise wired links, such as an Ethernet cable, and/or wireless links to access nodes or different networks. The network interfaces 806 allow the processing unit 802 to communicate with remote units via the networks. For example, the network interfaces 806 may provide wireless communication via one or more transmitters/transmit antennas and one or more receivers/receive antennas. In an aspect, the processing unit 802 is coupled to a local-area network 822 or a wide-area network for data processing and communications with remote devices, such as other processing units, the Internet, or remote storage facilities.

Figure 9:
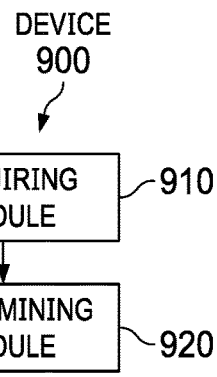
FIG. 9 shows an example of a wireless communication device.

FIG. 9 gives an exemplary device to implement the previous aspect. A device 900 includes an acquiring module 910 and a determining module 920. The acquiring module 910 is applied to acquire the SCS set or system bandwidth. The determining module 920 is applied to determine the maximum channel bandwidth and/or the maximum transmission bandwidth.

In an embodiment, a method to determine a system numerology includes acquiring, by a computing system, a candidate subcarrier spacing set. The method also includes determining, by the computing system, a maximum channel bandwidth or a maximum transmission bandwidth.

In an aspect, the method further includes, before the determining the maximum channel bandwidth or the maximum transmission bandwidth, determining, by the computing system, a basic subcarrier spacing in the candidate subcarrier spacing set.

In an aspect, the maximum transmission bandwidth is determined, by the computing system, in accordance with the maximum channel bandwidth.

In an aspect, the maximum channel bandwidth is determined, by the computing system, in accordance with a maximum fast Fourier transform (FFT) size.

In an aspect, the method further includes acquiring, by the computing system, a usable subcarrier spacing set from the subcarrier spacing set in accordance with a system channel bandwidth.

In an embodiment, a wireless device for encoding data with a polar code includes a processor and a computer readable storage medium. The computer readable storage medium stores programming for execution by the processor. The programming includes instructions for acquiring a candidate subcarrier spacing set. The programming also includes instructions for determining a maximum channel bandwidth or a maximum transmission bandwidth.

In an aspect, the programming further includes instructions for, before the determining the maximum channel bandwidth or the maximum transmission bandwidth, determining a basic subcarrier spacing in the candidate subcarrier spacing set.

In an aspect, the maximum transmission bandwidth is determined in accordance with the maximum channel bandwidth.

In an aspect, the maximum channel bandwidth is determined in accordance with a maximum fast Fourier transform (FFT) size.

In an aspect, the programming further comprising instructions for acquiring a usable subcarrier spacing set from the candidate subcarrier spacing set in accordance with a system channel bandwidth.

In an embodiment, a method includes providing an OFDM numerology scheme in a communications system permitting one or more of multiple subcarrier spacing options, multiple transmission TTI options, multiple CP options, multiple carrier bandwidth options, or multiple FFT sizes.

In an embodiment, a communications device includes a non-transitory memory storage comprising instructions and one or more processors in communication with the memory. The one or more processors execute the instructions for providing an OFDM numerology scheme in a communications system permitting one or more of multiple subcarrier spacing options, multiple transmission TTI options, multiple CP options, multiple carrier bandwidth options, or multiple FFT sizes.

In an embodiment, a method in a network component to determine a system numerology includes acquiring, by the network component, a candidate subcarrier spacing set. The method also includes determining, by the network component, a maximum channel bandwidth or a maximum transmission bandwidth.

In an embodiment, a wireless device for encoding data with a polar code a processor and a computer readable storage medium storing programming for execution by the processor. The programming includes instructions for acquiring a candidate subcarrier spacing set. The programming also includes instructions for determining a maximum channel bandwidth or a maximum transmission bandwidth.

In an embodiment, a non-transitory computer-readable medium storing computer instructions for instructing a wireless device to encode data with a polar code is provided. When executed by one or more processors, programming cause the one or more processors to perform acquiring a candidate subcarrier spacing set. When executed by one or more processors, the programming also cause the one or more processors to perform determining a maximum channel bandwidth or a maximum transmission bandwidth.

In one or more aspects, the method includes, before determining the maximum channel bandwidth or the maximum transmission bandwidth, determining, by the network component, a basic subcarrier spacing in the candidate subcarrier spacing set.

In one or more aspects, the maximum transmission bandwidth is determined, by the network component, in accordance with the maximum channel bandwidth.

In one or more aspects, the maximum channel bandwidth is determined, by the network component, in accordance with a maximum fast Fourier transform (FFT) size.

In one or more aspects, the method further includes acquiring, by the network component, a usable subcarrier spacing set from the subcarrier spacing set in accordance with a system channel bandwidth.

In one or more aspects, the transmission bandwidth location in the channel bandwidth is determined according to a number of resource blocks (RBs) and a reference point, where the reference point can be a center frequency of a carrier or the location of a guide band in the channel bandwidth.

In one or more aspects, each usable subcarrier spacing set is associated with FFT sizes such that a same sampling rate is maintained over different usable scalable subcarrier spacing (SCS) options.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module for determining one or more subcarrier spacing options from a candidate subcarrier spacing set that is associated with a carrier frequency band, determining one or more channel bandwidths selected from a set of channel bandwidths, or determining a basic subcarrier spacing in the candidate subcarrier spacing set and an acquiring unit/module for acquiring a usable subcarrier spacing set from the subcarrier spacing set in accordance with a carrier frequency band. The respective units/modules may be hardware, software, or a combination thereof. For instance, one or more of the units/modules may be an integrated circuit, such as field programmable gate arrays (FPGAs) or application-specific integrated circuits (ASICs).

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

What is claimed is:

1. A method comprising:
receiving, by an apparatus, a signal indicating one or more subcarrier spacing options from a first candidate subcarrier spacing set of multiple candidate subcarriers spacing sets,
wherein each candidate subcarrier spacing set of the multiple candidate subcarrier spacing sets is associated with a carrier frequency band and a maximum channel bandwidth, and wherein the first candidate subcarrier spacing set comprises subcarrier spacings of 30 kHz and 60 kHz, and the first candidate subcarrier spacing set is associated with a carrier frequency band sub 6 GHz and a maximum channel bandwidth of 100 MHz.

2. The method of claim 1, wherein the multiple candidate subcarrier spacing sets comprise a second candidate subcarrier spacing set, the second candidate subcarrier spacing set comprising subcarrier spacings of 60 kHz and 120 kHz, and wherein the second candidate subcarrier spacing set is associated with a carrier frequency band above 6 GHz and a maximum channel bandwidth of 400 MHz.

3. The method of claim 1, wherein the each candidate subcarrier spacing set of the multiple candidate subcarrier spacing sets is associated with the carrier frequency band, the maximum channel bandwidth, and a maximum transmission bandwidth.

4. The method of claim 3, wherein the first candidate subcarrier spacing set is associated with the carrier frequency band sub 6 GHz, the maximum channel bandwidth of 100 MHz, and a maximum transmission channel bandwidth of 40 MHz, or wherein a second candidate subcarrier spacing set of the multiple candidate subcarrier spacing sets is associated with a carrier frequency band above 6 GHz, a maximum channel bandwidth of 400 MHz, and a maximum channel bandwidth of 110 or 200 MHz.

5. The method of claim 1, wherein the each candidate subcarrier spacing set of the multiple candidate subcarrier spacing sets comprises a usable subcarrier spacing subset from the each candidate subcarrier spacing set of the multiple candidate subcarrier spacing sets, and the usable subcarrier spacing subset is associated with the carrier frequency band and the maximum channel bandwidth.

6. The method of claim 5, wherein the usable subcarrier spacing subset is associated with fast Fourier transform (FFT) sizes such that a same sampling rate is maintained over different usable subcarrier spacing options applicable to a channel bandwidth.

7. The method of claim 1, wherein the maximum channel bandwidth is determined in accordance with a maximum FFT size for a subcarrier spacing.

8. The method of claim 1, wherein the receiving the signal comprises one of:
receiving semi-static signaling, receiving dynamic signaling, receiving a radio resource control (RRC) signal, receiving a layer 1 (L1) signal, receiving a broadcast message, receiving a multi-cast message, or receiving a uni-cast message.

9. An apparatus comprising:
a processor; and
a computer readable storage medium storing programming for execution by the processor, the programming including instructions to:
receive a signal indicating one or more subcarrier spacing options from a first candidate subcarrier spacing set of multiple candidate subcarriers spacing sets,
wherein each candidate subcarrier spacing set of the multiple candidate subcarrier spacing sets is associated with a carrier frequency band and a maximum channel bandwidth, and wherein the first candidate subcarrier spacing set comprises subcarrier spacings of 30 kHz and 60 kHz, and the first candidate subcarrier spacing set is associated with a carrier frequency band sub 6 GHz and a maximum channel bandwidth of 100 MHz.

10. The apparatus of claim 9, wherein the multiple candidate subcarrier spacing sets comprise a second candidate subcarrier spacing set, the second candidate subcarrier spacing set comprising subcarrier spacings of 60 kHz and 120 kHz, and wherein the second candidate subcarrier spacing set is associated with a carrier frequency band above 6 GHz and a maximum channel bandwidth of 400 MHz.

11. The apparatus of claim 9, wherein the each candidate subcarrier spacing set of the multiple candidate subcarrier spacing sets is associated with the carrier frequency band, the maximum channel bandwidth, and a maximum transmission bandwidth.

12. The apparatus of claim 11, wherein the first candidate subcarrier spacing set is associated with the carrier frequency band sub 6 GHz, the maximum channel bandwidth of 100 MHz, and a maximum transmission channel bandwidth of 40 MHz, or wherein a second candidate subcarrier spacing set of the multiple candidate subcarrier spacing sets is associated with a carrier frequency band above 6 GHz, a maximum channel bandwidth of 400 MHz, and a maximum channel bandwidth of 110 or 200 MHz.

13. The apparatus of claim 9, wherein the each candidate subcarrier spacing set of the multiple candidate subcarrier spacing sets comprises a usable subcarrier spacing subset from the each candidate subcarrier spacing set of the multiple candidate subcarrier spacing sets, and the usable subcarrier spacing subset is associated with the carrier frequency band and the maximum channel bandwidth.

14. The apparatus of claim 13, wherein the usable subcarrier spacing subset is associated with fast Fourier transform (FFT) sizes such that a same sampling rate is maintained over different usable subcarrier spacing options applicable to a channel bandwidth.

15. The apparatus of claim 9, wherein the maximum channel bandwidth is determined in accordance with a maximum FFT size for a subcarrier spacing.

16. The apparatus of claim 9, wherein the instructions to receive the signal include instructions to perform one of:
receiving semi-static signaling, receiving dynamic signaling, receiving a radio resource control (RRC) signal, receiving a layer 1 (L1) signal, receiving a broadcast message, receiving a multi-cast message, or receiving a uni-cast message.

17. A method comprising:
transmitting, by a network component to a user equipment (UE), a signal indicating one or more subcarrier spacing options from a first candidate subcarrier spacing set of multiple candidate subcarriers spacing sets,
wherein each candidate subcarrier spacing set of the multiple candidate subcarrier spacing sets is associated with a carrier frequency band and a maximum channel bandwidth, and wherein the first candidate subcarrier spacing set comprises subcarrier spacings of 30 kHz and 60 kHz, and the first candidate subcarrier spacing set is associated with a carrier frequency band sub 6 GHz and a maximum channel bandwidth of 100 MHz.

18. The method of claim 17, wherein the multiple candidate subcarrier spacing sets comprise a second candidate subcarrier spacing set, the second candidate subcarrier spacing set comprising subcarrier spacings of 60 kHz and 120 kHz, and wherein the second candidate subcarrier spacing set is associated with a carrier frequency band above 6 GHz and a maximum channel bandwidth of 400 MHz.

19. The method of claim 17, wherein the each candidate subcarrier spacing set of the multiple candidate subcarrier spacing sets is associated with the carrier frequency band, the maximum channel bandwidth, and a maximum transmission bandwidth.

20. The method of claim 19, wherein the first candidate subcarrier spacing set is associated with the carrier frequency band sub 6 GHz, the maximum channel bandwidth of 100 MHz, and a maximum transmission channel bandwidth of 40 MHz, or wherein a second candidate subcarrier spacing set of the multiple candidate subcarrier spacing sets is associated with a carrier frequency band above 6 GHz, a maximum channel bandwidth of 400 MHz, and a maximum channel bandwidth of 110 or 200 MHz.

21. The method of claim 17, wherein the each candidate subcarrier spacing set of the multiple candidate subcarrier spacing sets comprises a usable subcarrier spacing subset from the each candidate subcarrier spacing set of the multiple candidate subcarrier spacing sets, and the usable subcarrier spacing subset is associated with the carrier frequency band and the maximum channel bandwidth.

22. The method of claim 21, wherein the usable subcarrier spacing subset is associated with fast Fourier transform (FFT) sizes such that a same sampling rate is maintained over different usable subcarrier spacing options applicable to a channel bandwidth.

23. The method of claim 17, wherein the maximum channel bandwidth is determined by the network component in accordance with a maximum FFT size for a subcarrier spacing.

24. The method of claim 17, wherein the transmitting the signal comprises one of:
transmitting semi-static signaling, transmitting dynamic signaling, transmitting a radio resource control (RRC) signal, transmitting a layer 1 (L1) signal, transmitting a broadcast message, transmitting a multi-cast message, or transmitting a uni-cast message.

25. A network component to determine system numerology and channel bandwidth, the network component comprising:

a processor; and a computer readable storage medium storing programming for execution by the processor, the programming including instructions to:

transmit, to a user equipment (UE), a signal indicating one or more subcarrier spacing options from a first candidate subcarrier spacing set of multiple candidate subcarriers spacing sets, wherein each candidate subcarrier spacing set of the multiple candidate subcarrier spacing sets is associated with a carrier frequency band and a maximum channel bandwidth, and wherein the first candidate subcarrier spacing set comprises subcarrier spacings of 30 kHz and 60 kHz, and the first candidate subcarrier spacing set is associated with a carrier frequency band sub 6 GHz and a maximum channel bandwidth of 100 MHz.

26. The network component of claim 25, wherein the multiple candidate subcarrier spacing sets comprise a second candidate subcarrier spacing set, the second candidate subcarrier spacing set comprising subcarrier spacings of 60 kHz and 120 kHz, and wherein the second candidate subcarrier spacing set is associated with a carrier frequency band above 6 GHz and a maximum channel bandwidth of 400 MHz.

27. The network component of claim 25, wherein the each candidate subcarrier spacing set of the multiple candidate subcarrier spacing sets is associated with the carrier frequency band, the maximum channel bandwidth, and a maximum transmission bandwidth.

28. The network component of claim 27, wherein the first candidate subcarrier spacing set is associated with the carrier frequency band sub 6 GHz, the maximum channel bandwidth of 100 MHz, and a maximum transmission channel bandwidth of 40 MHz, or wherein a second candidate subcarrier spacing set of the multiple candidate subcarrier spacing sets is associated with a carrier frequency band above 6 GHz, a maximum channel bandwidth of 400 MHz, and a maximum channel bandwidth of 110 or 200 MHz.

29. The network component of claim 25, wherein the each candidate subcarrier spacing set of the multiple candidate subcarrier spacing sets comprises a usable subcarrier spacing subset from the each candidate subcarrier spacing set of the multiple candidate subcarrier spacing sets, and the usable subcarrier spacing subset is associated with the carrier frequency band and the maximum channel bandwidth.

30. The network component of claim 29, wherein the usable subcarrier spacing subset is associated with fast Fourier transform (FFT) sizes such that a same sampling rate is maintained over different usable subcarrier spacing options applicable to a channel bandwidth.

31. The network component of claim 25, wherein the maximum channel bandwidth is determined by the network component in accordance with a maximum FFT size for a subcarrier spacing.

32. The network component of claim 25, wherein the instructions to transmit the signal include instructions to perform one of:

transmitting semi-static signaling, transmitting dynamic signaling, transmitting a radio resource control (RRC) signal, transmitting a layer 1 (L1) signal, transmitting a broadcast message, transmitting a multi-cast message, or transmitting a uni-cast message.

* * * * *